July 4, 1961   G. P. JOHNSON   2,990,622
COMBINATION PROTRACTOR AND LEVEL
Filed June 13, 1958
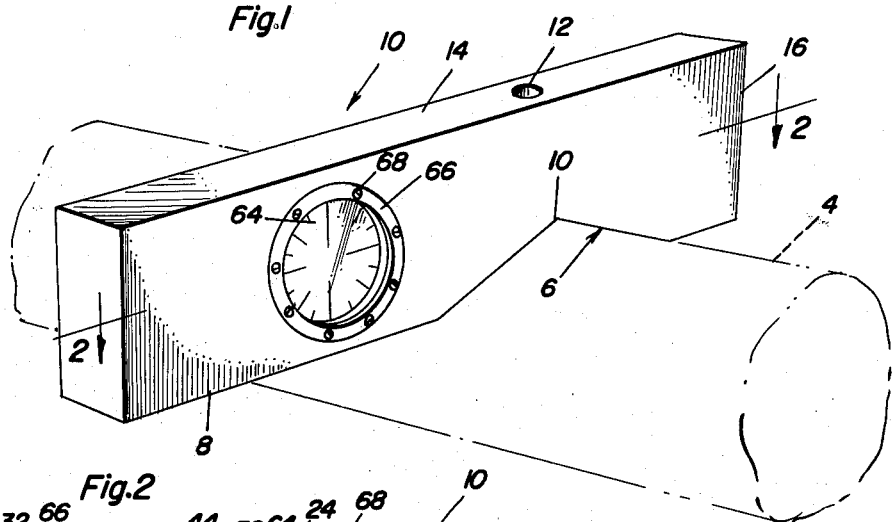
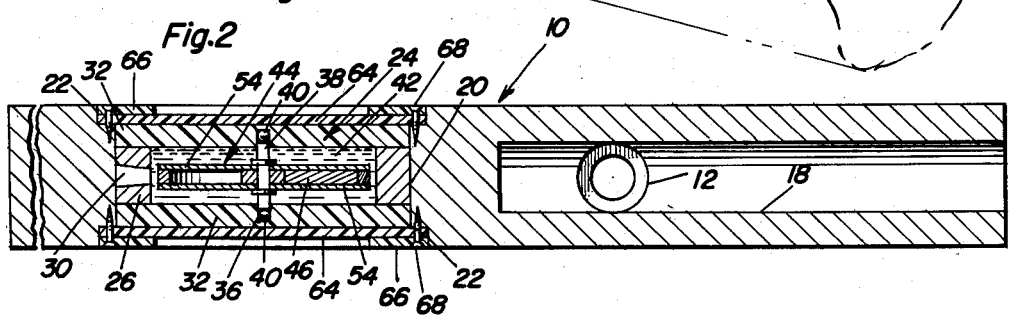
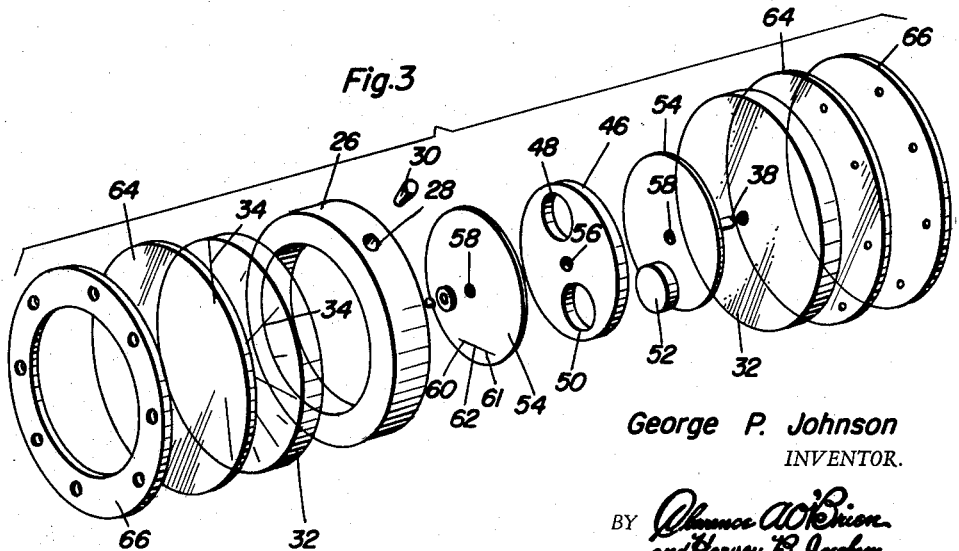
George P. Johnson
INVENTOR.

United States Patent Office 2,990,622
Patented July 4, 1961

2,990,622
COMBINATION PROTRACTOR AND LEVEL
George P. Johnson, North Star Route, Cabool, Mo., assignor of twenty percent to Gerald R. Johnson and twenty percent to James P. Johnson, Cabool, Mo.
Filed June 13, 1958, Ser. No. 741,775
2 Claims. (Cl. 33—215)

The present invention relates to certain new and useful improvements in a level and protractor combined for use primarily, but not necessarily, as an instrumentality to assist the user thereof in plotting and laying-out work needs for a given or particular job.

Although this preliminary explanation is not intended to be restrictive as to the scope of concept it is to be pointed out that your applicant, a steamfitter, has on numerous occasions discovered the need for a measuring device and level that could be quickly and easily used to locate accurately the angle of take-off for branch lines from the main header under construction. To be serviceable and practical, an acceptably usable tool or implement must unquestionably serve to locate accurately any angle on the outside circumference of a horizontal piece of circular shape, where it be a pipe, shaft or other circular workpiece. In addition, to be acceptable and to meet with widespread endorsement and use, the implement or tool has to be rugged, simple, efficient and reliable and easy to handle and susceptible of coping with rough handling by impetuous mechanics. With these prerequisites in mind the tool herein disclosed is believed to possess all of the necessary components in requisite cooperating relationship to comply with the preceding and other requirements of manufacturers, retailers, construction men and users.

The invention disclosed is the result of trial and error experimentations extending over a period of time and employs a liquid filled case capable of accurate use over the required 360° span of operation. In carrying out the preferred embodiment I use an elongated rigid stock having a first lengthwise straightedge, said edge having a substantially V-shaped notch opening therethrough and adapted to be seated on and manually moved around the surface of said workpiece, a center punch hole formed through said stock with an inner end alined with the vertex of said notch and the outer end opening through the second lengthwise edge of said stock, and a prescribed indicating level incorporated in said stock and constructed for compatible cooperation with said notch and center punch hole and making it possible by striking a center punch in said hole, that is, when the indicating media of the level presents the desired reading, to locate and visibly mark any degree of an angle between horizontal and vertical on a horizontally positioned circular workpiece.

Novelty is also predicated upon the construction set forth and wherein said level is effective throughout a full 360° circle and is characterized by at least one fixed dial having graduations to register with a rotatable indicator provided with two aligned horizontal lines with a dot between the adjacent inner ends of said lines, whereby when a vertical graduation line on said dial registers with said dot a perfect cross with a dot at the point of intersection of lines is had, this for quick and accurate reading.

More specifically a preferred embodiment, structurally construed, is that which is characterized by a circular hollow case faced with opposed spaced parallel graduated dials, said dials having axially aligned centered bearings, a shaft spanning the central space between said dials and having its ends journaled in said bearings, and an indicator in said space and mounted on said shaft, said indicator comprising a disk having a weight of predetermined prescribed size and mass embodied therein, and said disk having index median coordinated with said weight, graduations on each dial being the same and made up of circumferentially spaced equidistant radial lines, the media on each side of said disk comprising a pair of straight lines having inner ends which are spaced apart and aligned with each other, there being a red dot appearing in the space between said ends.

Other objects, features and advantages will become more readily apparent from the following description and the accompanying drawing.

In the drawing wherein like numerals are employed to designate like parts throughout the views:

FIG. 1 is a perspective view of the protractor-type level constructed in accordance with the principles of the present invention and showing, approximately, the manner in which it may be used on the circular workpiece such as a pipe, rod or the like.

FIG. 2 is an enlarged view taken on the line 2—2 of FIG. 1 looking in the direction of the arrows.

FIG. 3 is an exploded perspective view in which all of the components of the level proper appear in their cooperating side-by-side relationship.

With reference now to FIG. 1 the cylindrical rod or workpiece is denoted by the numeral 4 and in use the V-shaped notch 6 in the lengthwise straightedge 8 of the stock 10 is placed upon the work in a well-known manner. The vertex of the notch is denoted at 10 and there is a transverse hole 12 which is formed through the stock and the inner or lower end of this is in registration with the vertex point 10. The upper end opens through the upper straightedge 14. Extending through the transverse end 16 at the right is a socket 18 which, as shown in FIG. 2, may be used as a storage pocket for an insertable and removable center punch (not shown).

The construction of the level is as best shown in FIGS. 2 and 3. In the assembled view of FIG. 2 it will be evident that the principal parts are located in a hole 20 provided therefor in the stock. The entrance portions to the hole are recessed as at 22. The aforementioned hollow case 24 comprises a center ring or annulus 26 provided in its peripheral portion with a tapered hole 28 to accommodate a closing plug 30. Cemented or otherwise mounted on the peripheral opposite edges of the ring are the transparent plastic or equivalent circular plates which are here referred to as dials 32. Each dial has its readable surface or face provided with a plurality of circumferentially spaced equi-distant graduations or measuring lines 34. It will be seen that the interior surfaces of the dials are provided with axially aligned sockets 36 to accommodate end portions of a short shaft 38 which spans the space between the dials. Interposed between each end and the bottom of the socket is an anti-friction ball 40. The space in this contains a suitable liquid 42. The liquid is placed in the space by way of the hole 28 after which the hole is tightly plugged. The rotary indicator or wheel, also called a disk, is denoted by the numeral 44 and is of composite construction and is keyed on the central portion of the shaft. This indicator is of a composite construction and comprises a circular disk-like center member 46 which is seen in FIG. 3 is provided with diametrically opposite holes 48 and 50. The hole 50 serves to accommodate the lead or equivalent weight 52 which may be said to be carried by one of the circular cover plates or laminations 54. The parts 46 and 54 are provided with centrally aligned holes 56 and 58 to accommodate the shaft. The members 54 are cemented to opposite sides of the intervening member 46. Each member 54 is provided with a pair of aligned marker lines 60 and 61, inner ends of which are spaced apart and in which space there is a red indicator dot 62.

The assembling, protecting and retaining lenses or covers are denoted by the numeral 64 and are of increased diameter to set in the recesses 22 provided therefor and are held in place by the trim-rings 66. Suitable fasteners 68 serve to secure the rings 64 in place.

Thus the self-levelling indicator 44 is also referred to as a composite or laminated levelling wheel. After this wheel, shaft and thrust bearings have been assembled and placed in proper position the dials 32 are cemented on each side of the intervening ring with the levelling wheel inside the housing or case thus formed. Liquid is then introduced through the opening filling all the space within the case except a small air space which is left to partly absorb excessive expansion and contraction of liquids. The opening is then sealed by inserting the plug and cementing it permanently in place. The liquid will act as a lubricant for the shaft and also shock absorber and stabilizer for the levelling wheel.

The implement disclosed serves to satisfactorily do all the work usually done with a spirit or bubble level in a more accurate manner and greater ease of handling. In addition it will locate any degree of angle between horizontal and vertical on a full 360° circle. The manner in which the dials are calibrated and the mode of specially marking the indicator members 54, as at 60, 61 and 62, provides for quick and easy readings. Readings will be taken when a vertical calibration line and the horizontal lines on the indicator make a perfect cross with the red dot at the point of intersection. The reading of degrees in numerals will be shown in black on a white background thus making the level easier to read in dark places in which the implement many times has to be used. The fact is that this implement or tool has been designed with ease of reading of prime consideration. Then too, the fact that the level is read from the lower portion of the dial also contributes to ease of reading.

The construction is designed for mounting in a stock which may be of wood, metal, commercial plastics or other suitable materials according to the use required or planned. The size, shape and calibration will vary according to the needs of varying users.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A level comprising a stock and a level mounted in an opening provided therefor in said stock, said level embodying a hollow fluid-tight case comprising a ring of prescribed diameter having a smooth-surfaced outer periphery, a pair of circular flat-faced transparent dials having circumferentially spaced radial calibrations, said dials being of a diameter corresponding to the outer diameter of said ring and secured to opposite marginal edge portions of said ring with the ring then interposed between the dials and defining a chamber, said chamber containing damping liquid, the opposed interior surfaces of said dials being provided at their respective axial central portions with axially aligned sockets, the outer ends of said sockets being closed and the inner open ends opening into said chamber, a single ball bearing located in the bottom of each single socket, a shaft spanning the space between the socketed portions of said dials and having its respective end portions fitting telescopically and rotatably into said sockets and the terminals thereof having end-thrust engagement with their respective ball bearings, and a self-leveling wheel constituting an indicator and keyed on a central portion of said shaft and embodying a disk, said disk being of uniform cross-sectional thickness and having diametrically opposite holes, a weight located in one hole, and cooperating discoidal laminations secured to opposite outer sides of said disk and covering the respective holes and retaining said weight therebetween.

2. The structure defined in claim 1 and wherein the combined thickness of the disk and laminations secured to opposite surfaces thereof is predetermined and less than the corresponding dimension of the chamber containing the same, said laminations being spaced in parallelism from the dials and the interior surfaces of the dials being flat so that the calibrations on the dials more satisfactorily cooperate with the laminations, each lamination being provided eccentrically with marker means cooperable with the calibrations, the marker means in each instance comprising a pair of aligned lines which are in alignment with each other at their inner ends and said inner ends cooperating with an intervening marker dot which is at the exact center of the marker defined by the cooperating lines and whereby when a calibration on the cooperating dial is in the vertical position said calibration cooperates with the dot and the accompanying lines in defining an easy-to-see cross from the dot occurring at the point of intersection of the respective cooperating lines and graduation.

References Cited in the file of this patent
UNITED STATES PATENTS

| | | |
|---|---|---|
| 657,443 | Newton | Sept. 4, 1900 |
| 851,717 | Watts | Apr. 30, 1907 |
| 2,298,072 | Somerville et al. | Oct. 6, 1942 |
| 2,383,527 | Whitechester | Aug. 28, 1945 |
| 2,531,077 | Mullin | Nov. 21, 1950 |
| 2,580,601 | Rouse | Jan. 1, 1952 |

FOREIGN PATENTS

| | | |
|---|---|---|
| 136,856 | Great Britain | Dec. 31, 1919 |
| 193,783 | Great Britain | Mar. 1, 1923 |